United States Patent
Kotrla et al.

(10) Patent No.: US 8,284,691 B2
(45) Date of Patent: Oct. 9, 2012

(54) ESTIMATING DATA THROUGHPUT

(75) Inventors: Scott R. Kotrla, Wylie, TX (US);
Matthew W. Turlington, Richardson, TX (US); Michael U. Bencheck, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 482 days.

(21) Appl. No.: 12/637,831

(22) Filed: Dec. 15, 2009

(65) Prior Publication Data
US 2011/0141922 A1    Jun. 16, 2011

(51) Int. Cl.
*H04J 1/16* (2006.01)
(52) U.S. Cl. .................................................... 370/252
(58) Field of Classification Search .................. 370/252
See application file for complete search history.

(56) References Cited

U.S. PATENT DOCUMENTS

| | | | |
|---|---|---|---|
| 6,987,739 B2 * | 1/2006 | Kitazawa et al. | 370/252 |
| 7,715,314 B2 * | 5/2010 | Igarashi et al. | 370/230 |
| 7,990,882 B1 * | 8/2011 | Bedair et al. | 370/252 |
| 2007/0217343 A1 * | 9/2007 | Znamova et al. | 370/252 |
| 2011/0128864 A1 * | 6/2011 | Chan et al. | 370/252 |

* cited by examiner

*Primary Examiner* — Hassan Kizou
*Assistant Examiner* — Ashil Farahmand

(57) ABSTRACT

A method may include transmitting a first data burst and a second data burst to a circuit or network under test, the first data burst having a smaller size than the second data burst. The method may also include determining a first latency associated with the first data burst based on time information associated with the first data burst and determining a second latency associated with the second data burst based on time information associated with the second data burst. The method may further include calculating an estimated throughput of the circuit or network under test based on a difference in the first and second latencies, a difference in size for the first and second data bursts, and a first data rate at which the first and second data bursts were transmitted.

18 Claims, 5 Drawing Sheets

ESTIMATING DATA THROUGHPUT

BACKGROUND INFORMATION

Routing data in networks has become increasingly complex due to increased overall traffic and customer bandwidth requirements. As a result, network paths and/or devices must be tested to ensure that each path/device is meeting customer requirements.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to testing a circuit or network to determine data throughput. In one exemplary implementation, signal bursts are transmitted to the circuit or network under test at a line rate above the expected throughput to generate an initial approximation of the throughput/bandwidth. Bursts at a rate above the approximated bandwidth may then be transmitted to the circuit or network to refine the throughput measurement.

Figure 1:
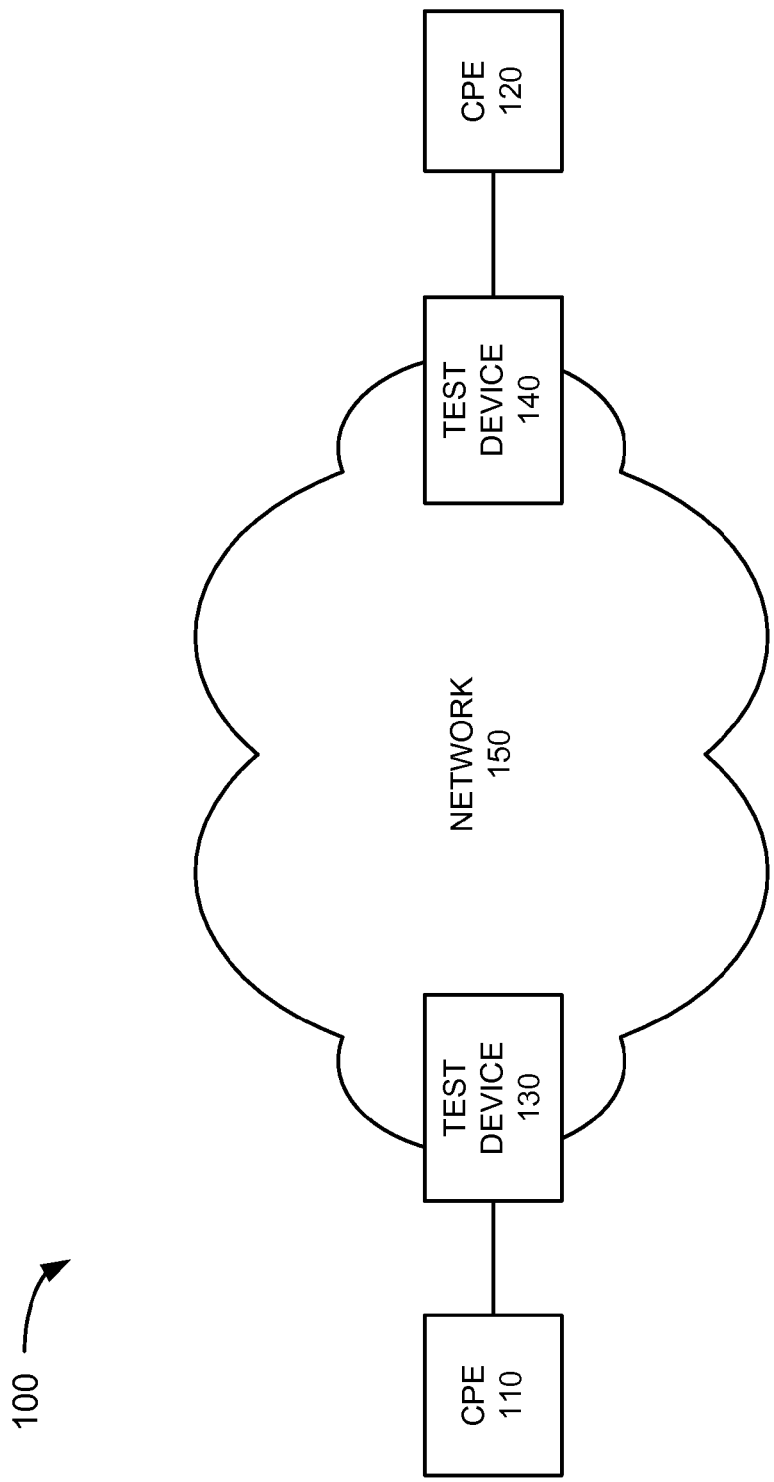
FIG. 1 illustrates an exemplary network in which systems and methods described herein may be implemented.

FIG. 1 is a block diagram of an exemplary network 100 in which systems and methods described herein may be implemented. Network 100 may include customer premises equipment (CPE) 110, CPE 120, test device 130, test device 140 and network 150. The number of elements illustrated in FIG. 1 is provided for simplicity. It should be understood that network 100 may include additional elements, such as additional CPE components, test devices and/or network devices.

CPE 110 and 120 may represent any equipment or device, such as time division multiplexed (TDM) circuits, a telephone system (e.g., a private branch exchange (PBX), a voice over Internet protocol (VoIP) system), one or more computers, one or more servers, one or more switches, one or more routers, a network (e.g., a local area network (LAN), a wide area network (WAN), an optical network, etc.) associated with a customer, or other devices/systems associated with a customer. CPE 110 and CPE 120 may communicate with other devices via a network, such as network 150, via any number of protocols, such as Ethernet, Gigabit Ethernet, Frame Relay, asynchronous transfer mode (ATM), time division multiplexing (TDM), Internet protocol (IP), synchronous optical network (SONET), synchronous digital hierarchy (SDH), etc.

CPE 110 and CPE 120 may be associated with the same customer or different customers. For example, CPE 110 and CPE 120 may represent origination and destination devices associated with a dedicated, private communication service between CPE 110 and CPE 120 that may be provided by a service provider associated with test devices 130/140 and/or network 150. Alternatively, CPE 110 and CPE 120 may represent different entities/customers that are provided with shared or dedicated communication services provided by a service provider associated with test device 130/140 and/or network 150.

Test devices 130 and 140 may include one or more devices used to measure latency and calculate throughput associated with the network path between CPE 110 and CPE 120, as described in detail below. In one implementation, test devices 130 and 140 may each be coupled to a portion of the network under test. For example, test device 130 may be connected to an ingress node of a circuit under test and test device 140 may be connected to an egress node of a circuit under test.

In each case, test devices 130 and 140 may be used to transmit and/or receive test data, measure latency and/or calculate throughput, as described in detail below. The throughput information may then be used to determine whether a path is meeting throughput expectations.

Network 150 may include one or more wired, wireless and/or optical networks that are capable of receiving and transmitting data, voice and/or video signals, including multimedia signals that include voice, data and video information. For example, network 150 may include one or more public switched telephone networks (PSTNs) or other type of switched network. Network 150 may also include one or more wireless networks and may include a number of transmission towers for receiving wireless signals and forwarding the wireless signals toward the intended destinations. Network 150 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. In addition, test device 130 is shown as a separate device from CPE 110 and test device 140 is shown as a separate device from CPE 120. In other implementations, the functions performed by test device 130 and CPE 110 may be performed by a single device or node. For example, CPE 110 may perform the testing and measuring functions of test device 130 described below. Similarly, the functions performed by test device 140 and CPE 120 may be performed by a single device or node.

Figure 2:
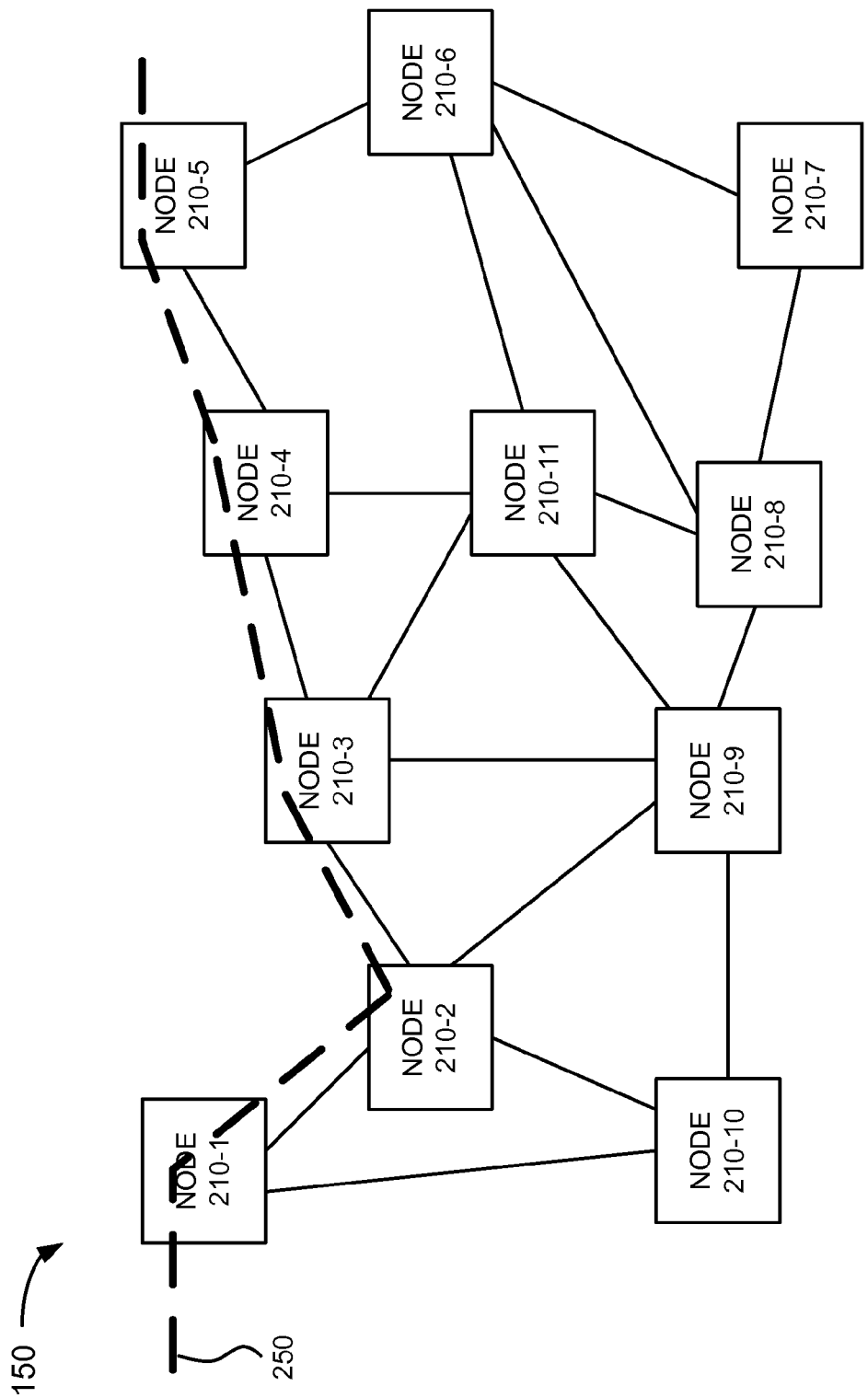
FIG. 2 illustrates an exemplary configuration of a portion of the network of FIG. 1.

FIG. 2 illustrates a portion of network 150 consistent with implementations described herein. In this implementation, network 150 may represent a mesh network that includes a number of nodes 210-1 through 210-11, referred to collectively as nodes 210 and individually as node 210 or node 210-N (where N represents any value). In mesh network 150, each line connecting one of nodes 210 to another of nodes 210 may represent one or more wired connections (e.g., Ethernet cable, optical fibers, etc.) or wireless connections interconnecting nodes 210.

As illustrated in FIG. 2, each node 210 in network 150 may be connected to several other nodes 210 to form a mesh network that allows traffic from a source to a destination to be routed in several different ways. For example, FIG. 2 illustrates an exemplary path 250. Referring to FIG. 2, traffic may be transmitted from node 210-1 to node 210-5 via path 250 (shown by the dashed line), which includes nodes 210-1, 210-2, 210-3, 210-4 and 210-5. It should be understood that traffic may be transmitted from node 210-1 to node 210-5 via other paths (e.g., via node 210-1, 210-2, 210-3, 210-11, 210-6 and 210-5). Similarly, network 150 may include multiple paths connecting other ones of nodes 210 and may use a particular path based on network conditions.

Each of nodes 210 may include a switch, router, or another network device capable of routing data. In an exemplary implementation, path 250 (also referred to herein as circuit 250) may represent a circuit for a particular customer and test devices 130 and/or 140 may be configured to test the throughput of circuit 250, as described in detail below.

The exemplary network configuration and path illustrated in FIG. 2 are provided for simplicity. It should be understood that a typical network 150 may include more or fewer nodes 210 than illustrated in FIG. 2. Network 150 may also include additional elements, such as amplifiers, switches, gateways, routers, monitoring systems, etc., that aid in routing traffic toward its intended destination.

Figure 3:
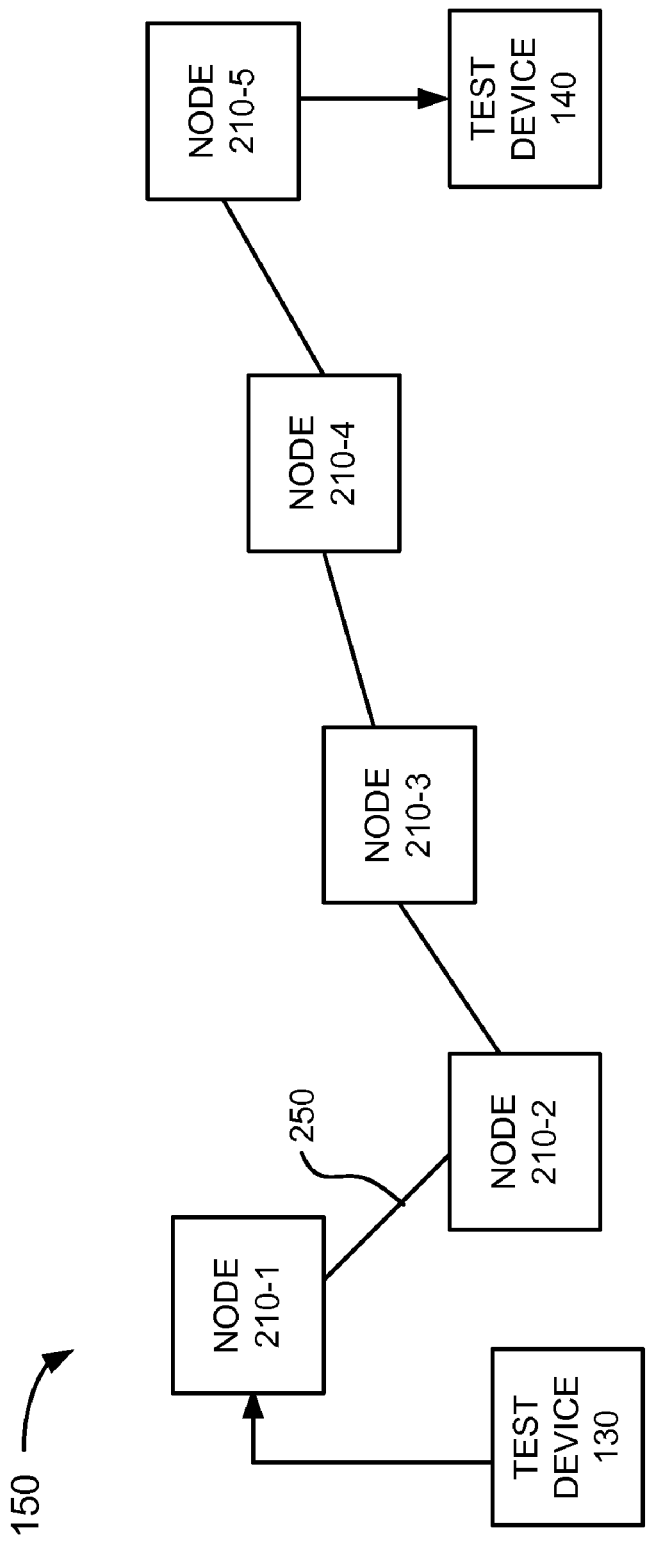
FIG. 3 illustrates an exemplary configuration of the test devices of FIG. 1 coupled to the portion of the network of FIG. 2.

FIG. 3 illustrates an exemplary scenario in network 150 in which test device 130 and test device 140 may be used to test a circuit, such as circuit 250 that includes nodes 210-1, 210-2, 210-3, 210-4 and 210-5. Referring to FIG. 3, test device 130 may represent a transmitter device used to generate and transmit test data to circuit 250. The test data may include multiple data bursts that will be transmitted from node 210-1 to node 210-5 through nodes 210-2, 210-3 and 210-4. At the end of circuit 250, test device 140 may represent a receiver device used to loop back the data bursts to test device 130. Alternatively, test device 140 may be used to measure latency and calculate throughput associated with circuit 250, as described in detail below.

Figure 4:
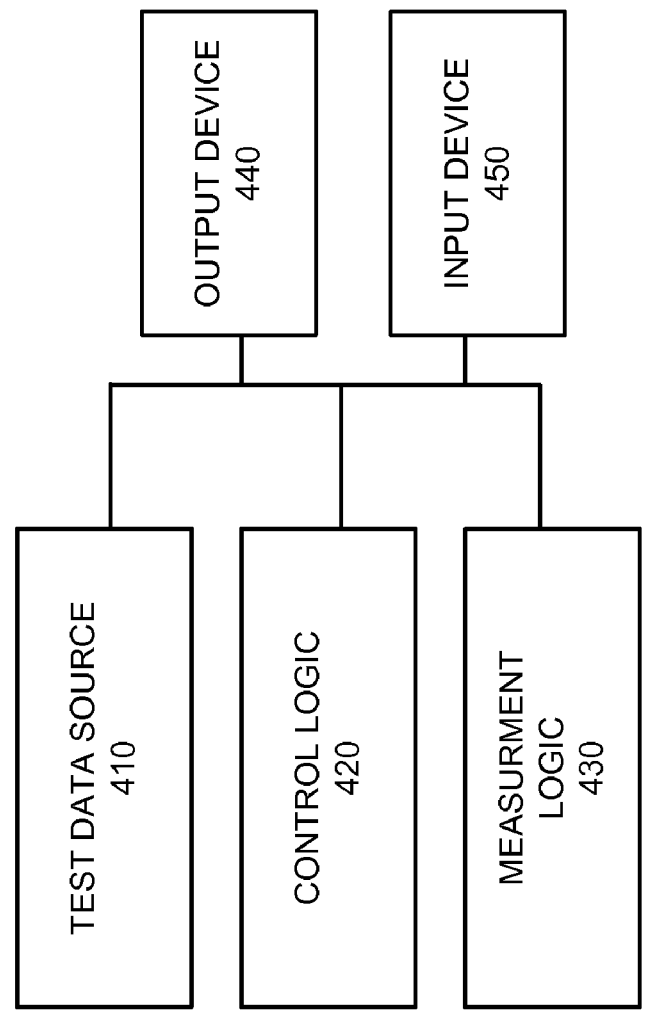
FIG. 4 illustrates an exemplary configuration of one or more of the test devices of FIG. 3.

FIG. 4 illustrates an exemplary configuration of test device 130. Test device 140 may be configured in a similar manner. Referring to FIG. 4, test device 130 may include test data source 410, control logic 420, measurement logic 430, output device 440 and input device 450.

Test data source 410 may include any conventional data/signal source that generates test data for transmission to a circuit/network under test. For example, test data source 410 may generate data bursts for transmitting to node 210 at adequate bit rates to support testing high speed data paths (e.g., Gigabit Ethernet or higher).

Control logic 420 may include a processor, microprocessor, application specific integrated circuit (ASIC), field programmable gate array (FPGA) or another logic device or component that controls operation of test device 130. For example, control logic 420 may include a user interface that allows a network engineer or other test personnel to select a rate and a burst size for test transmissions.

Measurement logic 430 may include a processor, microprocessor, ASIC, FPGA or another logic device or component that is used to measure latency associated with a device under test (e.g., a circuit, a network, a router, a switch, etc.) and calculate data throughput using the latency information. For example, measurement logic 430 may receive information regarding test packets transmitted on circuit 250, calculate the latency associated with circuit 250 and calculate the throughput of circuit 250 based on the latency information.

Output device 440 may include one or more interfaces and/or queues via which data will be output to a device/circuit under test. For example, test data source 410 may forward data bursts for output to node 210-1 via output device 440. Output device 440 may also include a display (e.g., a liquid crystal display (LCD) or light emitting diode (LED) display) that outputs information to an operator, such as a network engineer conducting a test. Input device 450 may include one or more interfaces via which data packets are received.

For example, in some implementations, test device 130 may send test frames or packets to test device 140 via output device 440, receive the returned test frames/packets via input device 450 and calculate an approximate latency associated with the circuit or network based on the time tags included with the test data and/or a round trip time associated with sending and receiving the test data. In either case, test device 130 may calculate the throughput of path 250, as described in detail below. In other implementations, test device 130 may send test data to test device 140, which determines the latency and calculates the throughput. In each case, test device 130 and/or test device 140 may operate to determine latency and calculate throughput for a device/circuit/network under test in network 150.

The components in test devices 130 and 140 may include software instructions contained in a computer-readable medium, such as a memory. A computer-readable medium may be defined as one or more memory devices. The software instructions may be read into memory from another computer-readable medium or from another device via a communication interface. The software instructions contained in memory may cause the various logic components to perform processes that will be described below. Alternatively, hardwired circuitry may be used in place of or in combination with software instructions to implement processes consistent with the principles of the invention. Thus, systems and methods described herein are not limited to any specific combination of hardware circuitry and software.

Figure 5:
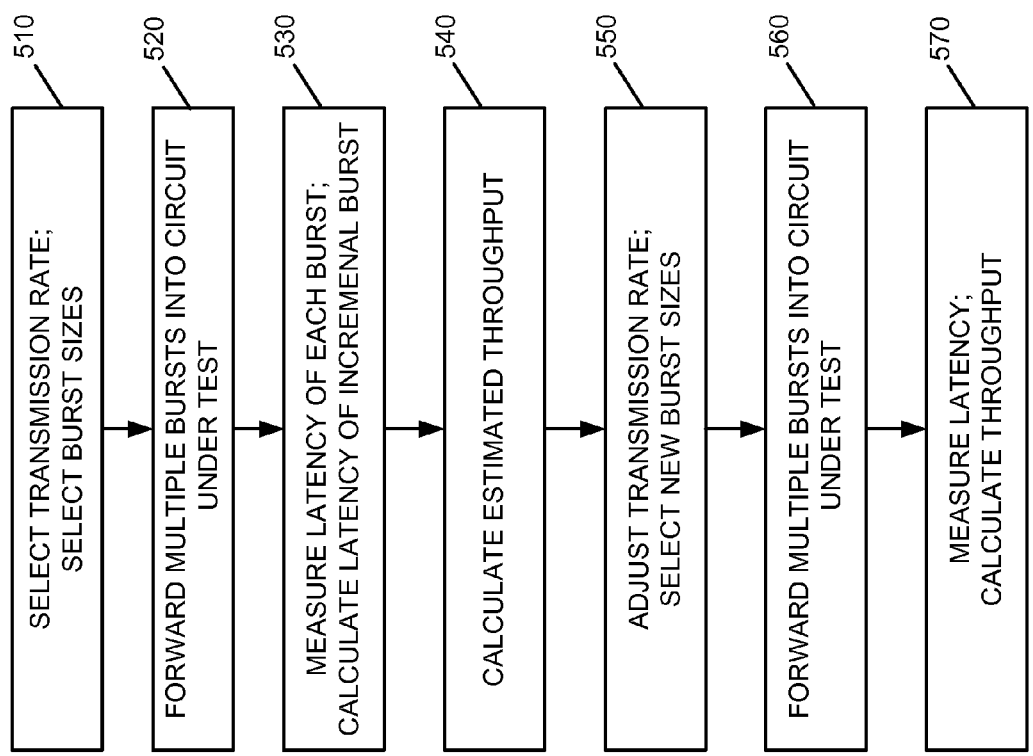
FIG. 5 is a flow diagram illustrating exemplary processing associated with testing the portion of the network illustrated in FIG. 3.

FIG. 5 is a flow diagram illustrating exemplary processing associated with testing and measuring throughput. In an exemplary implementation, the throughput of a circuit or network may be determined without requiring individual testing of each node in the circuit, as described in detail below. In this example, assume that test device 130 is coupled to node 210-1 and that test device 140-1 is coupled to node 210-5. Further assume that test device 140 is configured to loop back test packets transmitted from test device 130 back over path 250 to test device 130.

Processing may begin with a network engineer or another party associated with monitoring network 150 selecting a transmission rate associated with testing circuit 250 (act 510). For example, the network engineer may select the transmission rate associated with the testing to be a rate much higher than the expected throughput of circuit 250. As one example, the network engineer may select the test rate be the nominal line rate of test device 130. In this example, assume that the nominal line rate of test device 130 with 68 byte frames is 1,420,454.5 frames/sec. It should be understood that other lines rates and frame sizes may be used.

The network engineer may also select burst sizes for the test (act 510). For example, sending multiple bursts at line rate of the test equipment can be used to approximate the bandwidth of the device/circuit under test. In an exemplary implementation, the network engineer may select two different burst sizes. For example, testing circuit 250 using two different sized data bursts and measuring latency associated with each burst allows steady state latency to be subtracted out. That is, latency associated with buffering that may occur in one or more of nodes 210 of circuit 250 may be essentially eliminated from the latency determination. The maximum latency of each burst may also be equal to the latency of the last frame of the burst, if the transmission rate is selected to be higher than the throughput.

In each case, the burst sizes may be selected to ensure that the buffers in the circuit/path under test are cleared during testing. For example, input/output buffers in one or more of nodes 210-1 through 210-5 may buffer data packets. Such buffering may adversely impact latency and/or throughput calculations. As a result, in one implementation, the burst size may be calculated based on the buffer size of the circuit/network under test. That is, the amount of buffering in the entire circuit/network under test may be estimated and the burst size may be selected such that the data bursts effectively fill the buffers and are drained with little to no loss. In other implementations, the burst size may be chosen empirically through trial and error. In each case, the burst sizes may be selected to ensure that the buffers in circuit 250 clear during the testing. For example, the burst size may be chosen such that the rate at which the data bursts are transmitted does not far exceed the drain rate of the buffer since that may result in a loss of frames, which may adversely impact the latency and estimated throughput calculation. In an exemplary implementation, the network engineer may select the desired burst sizes via a user interface associated with control logic 420 and/or test data source 410.

In this example, assume that the network engineer has selected a first burst size (B1) of 10 frames and second burst size (B2) of 30 frames for the test of circuit 250, along with the line rate of 1,420,454.5 frames/second. Control logic 420 may instruct test data source 410 to output the two bursts to node 210-1. Test data source 410 may then forward the bursts (act 520).

As described above, in some instances, test device 140 may include logic that identifies that particular data is test data and send the test data back to test device 130 via network 150. For example, the test data may include an identifier in the header indicating that the data is test data. Alternatively, test device 140 may determine that the data is test data based on an origination address (e.g., an IP address, a particular VLAN address, etc.) associated with the test data. In each case, assume that test device 140 loops back the test data to test device 130 via circuit 250. For example, test device 140 may automatically send the test data back to test device 130 while performing little to no processing on the test data.

Test device 130 may receive the returned test data and determine the latency associated with circuit 520 (act 530). For example, the test data frames sent from test device 130 may include time tags associated with the time when the data frames were sent. Similarly, the data frames returned by test device 140 may include time tags indicating when the data frames packets were received and looped back. Measurement logic 430 may then subtract the initial time tag value from the returned time tag value to determine the latency associated with circuit 250. In another implementation, test device 130 may measure the amount of time from when the test data was sent by test device 130 until the time when the test data was received back at test device 130. This measurement may identify the round trip latency. Measurement logic 430 may divide this round trip delay time by two to get an approximation of the latency associated with circuit 250.

In each case, measurement logic 430 may calculate the latency (L1) for burst B1 and the latency (L2) for burst B2. The latency values L1 and L2 may represent the maximum latency values associated with bursts B1 and B2, respectively (e.g., the latency associated with the slowest device in circuit 250). In an exemplary implementation, test equipment 130 may support sending multiple test flows sequentially. In such situations, control logic 420 may signal test data source 410 to transmit multiple data bursts for both B1 and B2 in sequence, with a small delay between each test flow to allow the buffers in circuit 250 to buffer the data and to forward the data along circuit 250 in a normal operating manner. Multiple latency measurements for each burst size (B1 and B2) may then be averaged to generate a more accurate result.

Measurement logic 430 may then calculate an estimated latency associated with the incremental burst (e.g., B2−B1) as L2 minus L1. In this case, assume that L2 was calculated using ten L2 samples associated with ten data bursts B2, and L1 was calculated using ten L1 samples associated with ten data bursts B1. Continuing with the example above, assume that measurement logic 430 calculates L as $66.98 \times 10^{-6}$ seconds.

Measurement logic 430 may also calculate the incremental burst size as B2 minus B1 (B2−B1). That is, the incremental burst size is the difference in size for the first and second bursts. Continuing with the example above in which B2 was equal to 30 frames and B1 was equal to 10 frames, B is equal to 20 frames.

Measurement logic 430 may then calculate an estimated throughput using equation 1 below (act 540).

$$T = \left[ \frac{\frac{B}{R}}{\left(\frac{B}{R}\right) + L} \right] * R, \quad \text{(Equation 1)}$$

where T represents throughput, B represents the incremental burst size (i.e., B2−B1), R represents the data rate at which the test data was transmitted, and L represents the estimated latency (i.e., L2−L1).

Continuing with the example above, where B is equal to 20, R is equal to 1,420,454.5 frames/second, and L is equal to $66.98 \times 10^{-6}$ seconds, measurement logic 430 calculates T to be 246,731 frames/second. This value of T, referred to herein as T1, may correspond to an initial approximation of the throughput of circuit 250.

The network engineer may then adjust the rate for transmitting the data bursts to a rate slightly above the value of T1 (act 550). For example, after estimating the throughput T1, a network engineer may increase the rate to a level higher than the estimated throughput. As an example, the network engineer may select a rate less than 10% higher than the value of T1. In this case, assume that the network engineer selects a rate R equal to 247,035.57 frames/second.

The network engineer may also select new burst sizes for B1 and B2 (act 550). For example, assume that the network engineer selects B1 to be 1000 frames and B2 to be 9000 frames. In an exemplary implementation, the burst sizes B1 and B2 for the second set of data bursts may be much larger than the values of B1 and B2 in the initial set of data bursts (e.g., 10 frames and 30 frames in the example above). Using large burst sizes for the second set of bursts may provide increased accuracy with respect to measuring latency by ensuring that all buffers in circuit 250 are cleared. That is, the buffers associated with circuit 250 are filled and drained with little to no loss since the rate at which the data is being transmitted is relatively close to the actual throughput of circuit 250. Control logic 420 may then signal test data source 410 to transmit bursts B1 and B2 (act 560).

Similar to the discussion above, control logic 420 may send these bursts over a number of trials (e.g., 10 trials) and average the results. Measurement logic 430 may then calculate the latency L as the average value of L2 minus the average value of L1 (act 570). In this case, assume that measurement logic 430 calculates L to be equal to $94.63 \times 10^{-6}$ seconds. Measurement logic 430 may also calculate the incremental burst size B, which is equal to B2−B1 or 8000 frames in this example.

Measurement logic 430 may then calculate throughput T2 using equation 1 above (act 570). In this example, T2 is calculated as 246,315.81 frames/second versus the 246,731 frames/second calculated for T1. In this manner, measuring an approximate frame rate using a very high line rate for the test, followed by a second measurement at a line rate slightly higher than the approximated throughput allows a very accurate measurement of the throughput of circuit 250 to be made.

In some implementations, additional iterations may be performed to further refine the throughput measurement. In each case, the measured throughput may be compared to a nominal throughput value. For example, assume that circuit 250 is a synchronous transport signal (STS-3c) circuit with a bandwidth of 149.76 Mb/sec, 68 byte frames and 8 bytes of generic frame procedure (GFP). In this case, the expected throughput T0 is equal to 246,315.79 frames/sec (e.g., 149.76 Mb/sec/ [(68 bytes+8 bytes)(8 bits/byte)]. In the example above, the calculated value of T2 is within 0.1 parts per million (ppm) of T0. Therefore, performing the test methodology described above allows network personnel to quickly identify the throughput of a circuit or network under test in a very accurate manner. This may allow a service provider to quickly determine whether a circuit/network meets the customer's requirements (e.g., a service level agreement (SLA).

In addition, in some implementations, after performing a test and generating results, control logic 420 may output results of the test via a display screen (e.g., output device 440) included on test device 130. For example, control logic 420 may output both the first estimated throughput T1 and the second estimated throughput T2 via a display screen. In addition, in some implementations, when a test device (e.g., test device 130) determines that a circuit or network under test does not meet certain throughput requirements, the test device may automatically signal another network device (e.g., a control center) associated with monitoring the circuit/network under test. In this manner, when a problem occurs, network personnel associated with monitoring that portion of the network may be quickly notified of any potential problems.

The testing described above generally refers to a network engineer selecting data rates and burst sizes for testing a circuit, such as circuit 250, and test device 130 automatically calculating an estimated throughput. In other implementations, the data associated with the data bursts may be stored and the calculations associated with estimating throughput may be performed at a later time (e.g., offline when test device 130 is no longer connected to the circuit under test) and/or by another device or system. For example, the data may be transmitted to a network operations center for analysis.

In addition, in some implementations, all or most of the processing associated with estimating throughput may be performed automatically with little to no input by a network engineer. For example, control logic 420 of test device 130 may include a memory that stores instructions, such as an automated script, that allows control logic 420 to automatically measure, for example, maximum burst size without loss and then take accurate latency measurements at the maximum burst size, and/or a fraction of the maximum burst size. The automated script may also select burst sizes and transmission rates for the testing needed to perform the initial throughput estimate, as well as the additional testing to refine the estimated throughput. Using an automated script may further simplify the testing needed to estimate the throughput of a circuit or network under test.

Implementations described herein provide a testing methodology that allows data throughput to be estimated very quickly. In some implementations, all or some of the testing may be done automatically to further simplify the processing associated with estimating throughput.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to determining whether a customer circuit meets certain requirements, such as SLA requirements. In other instances, the methodology described above may be used in a lab environment to ensure that equipment meets its expected requirements prior to being deployed in the field. In addition, features have been described above with respect to testing a circuit or a portion of a network. In other instances, a single device may be tested to identify the data throughput.

In addition, various features have been described above with respect to test device 130 transmitting test data and estimating throughput based on information associated with the returned test data. In other implementations, test device 130 may transmit test data on a circuit/network under test and test device 140 may analyze the test data to determine an estimated throughput. That is, test device 140 may perform the latency estimation and throughput calculations described above.

Still further, while series of acts have been described with respect to FIG. 5, the order of the acts may be varied in other implementations. Moreover, non-dependent acts may be implemented in parallel.

It will be apparent to one of ordinary skill in the art that various features described above may be implemented in many different forms of software, firmware, and hardware in the implementations illustrated in the figures. The actual software code or specialized control hardware used to implement the various features is not limiting of the invention. Thus, the operation and behavior of the features of the invention were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as a processor, a microprocessor, an application specific integrated circuit, or a field programmable gate array, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A method, comprising:
  transmitting a first data burst and a second data burst to a circuit or network under test, the first data burst having a first size and the second data burst have a second size, wherein the first and second sizes are different;

determining a first latency associated with the first data
burst based on time information associated with the first
data burst;
determining a second latency associated with the second
data burst based on time information associated with the
second data burst;
generating an estimated latency based on the first and second latencies;
generating a first value representing an incremental burst
size based on the first and second burst sizes; and
calculating an estimated throughput of the circuit or network under test based on a difference in the first and
second latencies, a difference in the first and second
sizes of the first and second data bursts, and a first data
rate at which the first and second data bursts were transmitted, wherein the calculating includes:
dividing the first value by the first data rate to generate a
second value,
adding the estimated latency to the second value to generate a third value,
dividing the second value by the third value to generate
a fourth value, and
multiplying the fourth value by the first data rate to
generate a fifth value, the fifth value representing the
estimated throughput.

2. The method of claim 1, wherein the generating an estimated latency comprises:
subtracting the first latency from the second latency to
generate the estimated latency; and
wherein the generating a first value representing the incremental burst size comprises:
subtracting the first burst size from the second burst size to
generate the first value representing the incremental
burst size.

3. The method of claim 1, further comprising:
selecting the first data rate to be greater than an expected
throughput of the circuit or network under test.

4. The method of claim 1, further comprising:
selecting a second data rate, the second data rate being
greater than the estimated throughput;
transmitting a third data burst and a fourth data burst to the
circuit or network under test, the third data burst having
a third size and the fourth data burst having a fourth size,
the third size being smaller than the fourth size;
determining a second estimated latency associated with the
circuit or network under test based on time information
associated with the third and fourth data bursts; and
calculating a second estimated throughput based on a difference in the third and fourth sizes, the second estimated latency and the second data rate.

5. The method of claim 1, wherein the determining a first
latency comprises:
transmitting, from a test device, the first data burst from an
ingress point to an egress point of the circuit or network
under test,
receiving, at the test device, at least some of the first data
burst looped back from the egress point, and
determining the first latency based on time tags included
with the transmitted first data burst and time tags
included with the received looped back data.

6. The method of claim 1, further comprising:
transmitting a plurality of first data bursts; and
transmitting a plurality of second data bursts,
wherein the determining a first latency comprises:
determining first latency information associated with each
of the plurality of first data bursts, and
averaging the first latency information,
wherein the determining a second latency comprises:
determining second latency information associated with
each of the plurality of second data bursts, and
averaging the second latency information.

7. The method of claim 1, further comprising:
transmitting additional data bursts at a second data rate, the
second data rate being based on the estimated throughput; and
calculating a second estimated throughput based on
latency information associated with the additional data
bursts and the second data rate.

8. The method of claim 1, wherein the calculating an estimated throughput comprises:

$$\text{calculating } T = \left[ \frac{\frac{B}{R}}{\left(\frac{B}{R}\right) + L} \right] * R$$

where T represents the estimated throughput, B represents
a difference between the first and second burst sizes, R
represents the first data rate and L represents a difference
between the first and second latencies.

9. A device, comprising:
an output interface; and
logic configured to:
transmit, via the output interface, a first data burst and a
second data burst to a network or circuit under test, the
first data burst having a first size and the second data
burst have a second size, wherein the first size is less
than the second size,
determine a first latency associated with the first data
burst,
determine a second latency associated with the second
data burst,
generate an estimated latency based on the first and
second latencies,
generate a first value based on the first and second sizes,
and
calculate an estimated throughput of the network or
circuit under test based on a difference in the first and
second latencies, a difference in the first and second
sizes of the first and second data bursts, and a first rate
at which the first and second data bursts were transmitted, wherein when calculating an estimated
throughput, the logic is configured to:
divide the first value by the first rate to generate a
second value,
add the estimated latency to the second value to generate a third value,
divide the second value by the third value to generate
a fourth value, and
multiply the fourth value by the first rate to generate
the estimated throughput.

10. The device of claim 9, wherein when generating an
estimated latency, the logic is further configured to:
subtract the first latency from the second latency to generate the estimated latency, and when generating a first
value, the logic is configured to:
subtract the first burst size from the second burst size to
generate the first value.

11. The device of claim 9, wherein the logic is further
configured to:
receive an input identifying the first rate, the first rate being
higher than an expected throughput of the network or
circuit under test, and
transmit the first and second data bursts at the first rate.

12. The device of claim 11, wherein the logic is further configured to:
receive an input identifying a second rate, the second rate being greater than the estimated throughput and less than the first rate,
transmit a third data burst and a fourth data burst to the network under test, the third data burst having a third size and the fourth data burst having a fourth size, the third size being smaller than the fourth size,
determine a second estimated latency associated with the network or circuit under test based on time information associated with the third and fourth data bursts, and
calculate a second estimated throughput based on a difference in the third and fourth sizes, the second estimated latency and the second rate.

13. The device of claim 12, wherein the logic is further configured to:
receive an input identifying the third burst size and the fourth burst size, the third and fourth burst sizes being greater than the first and second burst sizes.

14. The device of claim 9, further comprising:
a test data source configured to generate the first and second data bursts.

15. The device of claim 14, further comprising:
a memory configured to store instructions,
wherein the logic is further configured to:
access the memory and automatically transmit additional data bursts to the network or circuit under test to refine the estimated throughput in accordance with the instructions.

16. The device of claim 15, wherein when automatically transmitting additional data bursts, the logic is configured to:
automatically select burst sizes for the additional data bursts, and
automatically select a second rate at which the additional data bursts are to be transmitted to the network or circuit under test.

17. A non-transitory computer-readable medium having stored thereon sequences of instructions which, when executed by at least one processor, cause the at least one processor to:
signal a data source to transmit a first data burst and a second data burst to a network or circuit under test at a first data rate, the first data burst having a first size and the second data burst have a second size, wherein the first size is less than the second size;
calculate an estimated latency for the network or circuit under test based on time information associated with the first and second data bursts;
calculate an estimated incremental burst size based on the first and second sizes of the first and second data bursts, and
calculate an estimated throughput of the network or circuit under test based on the estimated latency, a difference in the first and second sizes of the first and second data bursts, and the first data rate, wherein when calculating an estimated throughput, the instructions cause the at least one processor to:
divide the estimated incremental burst size by the first data rate to generate a first value,
add the estimated latency to the first value to generate a second value,
divide the first value by the second value to generate a third value, and
multiply the third value by the first data rate to generate a fourth value, the fourth value representing the estimated throughput.

18. The non-transitory computer-readable medium of claim 17, further including instructions for causing the at least one processor to:
signal the data source to transmit additional data bursts at a second data rate, the second data rate being based on the estimated throughput; and
calculate a second estimated throughput based on latency information associated with the additional data bursts, a difference in sizes of the additional data bursts, and the second data rate.

* * * * *